(12) United States Patent
Rahman et al.

(10) Patent No.: US 7,969,058 B2
(45) Date of Patent: Jun. 28, 2011

(54) PERMANENT MAGNET MOTOR WITH STATOR HAVING ASYMMETRIC SLOTS FOR REDUCING TORQUE RIPPLE

(75) Inventors: Khwaja M. Rahman, Troy, MI (US); Peter J. Savagian, Bloomfield Hills, MI (US); Matthew D. Laba, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 720 days.

(21) Appl. No.: 11/759,261

(22) Filed: Jun. 7, 2007

(65) Prior Publication Data

US 2008/0303370 A1 Dec. 11, 2008

(51) Int. Cl.
*H02K 1/14* (2006.01)
*H02K 1/16* (2006.01)
*H02K 1/24* (2006.01)

(52) U.S. Cl. ... 310/216.071; 310/216.072; 310/216.073; 310/216.091; 310/216.092; 310/216.094; 310/254.1; 310/179; 310/156.01; 310/156.53; 310/216.019

(58) Field of Classification Search ........... 310/216.011, 310/216.012, 216.018, 216.019, 216.071, 310/216.072, 216.073, 216.091–216.097, 310/156.01, 156.053; H02K 1/14, 1/16, 1/24
See application file for complete search history.

(56) References Cited

U.S. PATENT DOCUMENTS

| | | | | | |
|---|---|---|---|---|---|
| 3,154,708 A | * | 10/1964 | Shaffer | ........................ | 310/187 |
| 3,317,768 A | * | 5/1967 | Heilmann et al. | ..... | 310/216.102 |
| 4,227,106 A | * | 10/1980 | Druss et al. | .................... | 310/184 |
| 4,241,274 A | * | 12/1980 | Brammerlo | ............ | 310/216.071 |
| 4,554,491 A | * | 11/1985 | Plunkett | .................... | 318/400.41 |
| 4,672,253 A | * | 6/1987 | Tajima et al. | ................. | 310/269 |
| 5,107,159 A | * | 4/1992 | Kordik | ....................... | 310/156.44 |
| 5,801,463 A | * | 9/1998 | Suzuki et al. | .................... | 310/51 |
| 6,317,962 B1 | * | 11/2001 | Adachi et al. | .................... | 29/596 |
| 7,342,338 B2 | * | 3/2008 | Miyazaki et al. | ........ | 310/156.47 |
| 2005/0200223 A1 | * | 9/2005 | Tajima et al. | ............ | 310/156.46 |
| 2006/0037581 A1 | | 2/2006 | Miyashita et al. | | |
| 2006/0197399 A1 | | 9/2006 | Kataoka et al. | | |

FOREIGN PATENT DOCUMENTS

| | | |
|---|---|---|
| DE | 19652796 A1 | 6/1998 |
| JP | 07255158 | * 10/1995 |
| WO | 2005074099 A1 | 8/2005 |

OTHER PUBLICATIONS

Office Action dated Dec. 11, 2009 for German Patent Application No. 102008026756.2, filed Jun. 4, 2008.
Office Action issued on May 19, 2010, for Chinese Patent Application No. 200810109624.

* cited by examiner

*Primary Examiner* — Quyen Leung
*Assistant Examiner* — Terrance Kenerly
(74) *Attorney, Agent, or Firm* — Ingrassia Fisher & Lorenz, P.C.

(57) ABSTRACT

Permanent magnet motors with improved torque ripple and methods for designing the same have been provided. The permanent magnet motor can include a stator having a hollow core and defining a plurality of slots; a winding disposed in each of the slots; a rotor rotatably disposed inside the hollow core of the stator; and a plurality of permanent magnets supported by the rotor. Each of the slots has a slot opening, and at least one of the slot openings can be off-center with respect to the respective slot.

8 Claims, 5 Drawing Sheets

PERMANENT MAGNET MOTOR WITH STATOR HAVING ASYMMETRIC SLOTS FOR REDUCING TORQUE RIPPLE

TECHNICAL FIELD

The present invention generally relates to permanent magnet motors, and more particularly relates to permanent magnet motors with reduced torque ripple and methods for reducing torque ripple in permanent magnet motors.

BACKGROUND OF THE INVENTION

Permanent magnet motors may produce undesirable torque ripple that may result in unwanted vibration and noise. Conventional permanent magnet motors skew either the rotor or the stator in an attempt to reduce the torque ripple. However, skewing may introduce manufacturing complexity and increase cost. Skewing may also lower machine torque, and thus, lower machine performance.

Accordingly, it is desirable to provide permanent magnet motors with decreased torque ripple. In addition, it is desirable to provide methods for decreasing torque ripple in permanent magnet motors. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A permanent magnet motor is provided in accordance with an exemplary embodiment of the present invention. The permanent magnet motor includes a stator having a hollow core and defining a plurality of slots; a winding disposed in each of the slots; a rotor rotatably disposed inside the hollow core of the stator; and a plurality of permanent magnets supported by the rotor. Each of the slots has a slot opening, and at least one of the slot openings can be off-center with respect to the respective slot.

A method for designing a permanent magnet motor is provided in accordance with another exemplary embodiment of the present invention. The method includes determining the simulated torque ripple for a plurality of proposed permanent magnet motors with various stator slot opening positions, various stator slot positions, or both various stator slot opening and various stator slot positions; determining the simulated torque output for each of the plurality of proposed permanent magnet motors with the various stator slot opening positions, various stator slot positions, or both various stator slot opening and various stator slot positions; and choosing an optimized permanent magnet motor from the plurality of proposed permanent magnet motors based on the simulated torque ripples and the simulated torque outputs.

A permanent magnet motor in accordance with an exemplary embodiment of the present invention is provided. The permanent magnet motor includes a stator having a hollow core and defining a plurality of slots. Each of the slots has a slot opening, and the plurality of slots includes a first slot, a second slot adjacent to and spaced apart from the first slot at a first distance, a third slot, and a fourth slot adjacent to and spaced apart from the third slot at a second distance, in which the first distance is different from the second distance. The permanent magnet motor further includes a winding disposed in each of the slots; a rotor rotatably disposed inside the hollow core of the stator; and a plurality of permanent magnets supported by the rotor.

DESCRIPTION OF THE DRAWINGS

The present invention will hereinafter be described in conjunction with the following drawing figures, wherein like numerals denote like elements, and wherein.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
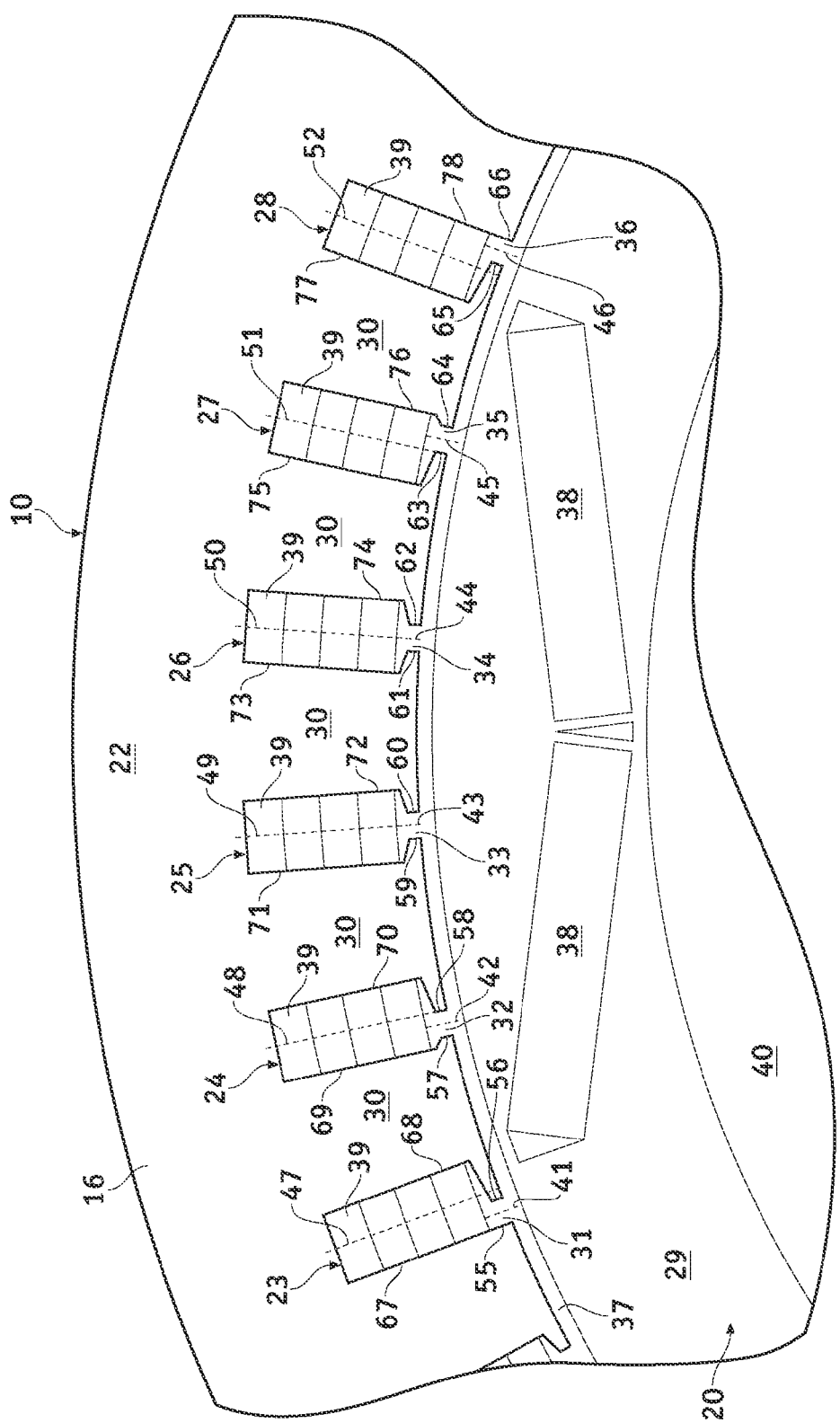
FIG. 1 is a partial cross-sectional view of a permanent magnet motor in accordance with an exemplary embodiment of the present invention.

FIG. 1 is a partial cross-sectional view of a permanent magnet motor 10 in accordance with an exemplary embodiment of the present invention. The view of FIG. 1 represents $\frac{1}{10}^{th}$ of a complete cross-sectional view of the motor 10. The motor 10 may form parts of various automobile components such as, for example, a traction machine for a fuel cell or electric vehicle or a motor/generator for a hybrid vehicle. The motor 10 may also be used in applications unrelated to motor vehicles, such as consumer appliances, medical instruments, tools, etc.

The motor 10 includes a stator 16 and a rotor 20 rotatably disposed within the stator 16. The stator 16 includes a stator core 22 that is formed by stacking a plurality of magnetic steel sheets that, when stacked, together form the shape of a cylinder having a hollow core. A plurality of slots 23-28 are formed in the stator core 22 and are arranged in a circumferential arrangement. Particularly, the view of FIG. 1 illustrates a first slot 23, a second slot 24, a third slot 25, a fourth slot 26, a fifth slot 27, and a sixth slot 28. As discussed in further detail below, each of the slots has a respective slot opening 31-36. The slot openings 31-36 are smaller than their respective slots 23-28. The stator core 22 also includes a plurality of stator teeth 30 that are disposed between the slots 23-28. Six stator slots 23-28 are illustrated in the view in FIG. 1, and the six stator slots 23-28 correspond to one pole of the motor 10. However, any phase, pole, and/or slot configuration is possible.

Bar windings 39 are inserted into each of the slots 23-28. Generally, the bar windings 39 are U-shaped windings that are inserted directly into the slots. In the illustrated embodiment, four bar windings 39 are disposed in each of the slots 23-28. However, a greater or fewer number of bar windings 39 can be disposed in each of the slots. In an alternate embodiment, hairpin windings, or other types of windings can be provided.

The rotor 20 includes a rotor core 29 that is formed by stacking a plurality of magnetic steel sheets that, when stacked, together form the shape of a cylinder. The rotor core 29 is disposed in the stator 22 hollow core, while being spaced at a predetermined distance from the stator core 22 such that a gap 37 is formed between the stator core 22 and the rotor core 29. The rotor core 29 supports a plurality of permanent magnets 38 that are embedded into the rotor core 29. In an alternate embodiment, the permanent magnets 38 can be circumferentially arranged on the rotor core 29. The permanent magnets 38 can be unitary magnets or a plurality of magnet portions that are either aligned or skewed, depending on the design and cost requirements. Generally, exemplary permanent magnets 38 are rare earth magnets such as neodymium iron boron or samarium cobalt magnets, although ceramic and alnico magnets may be used for other embodiments according to design requirements. A rotary shaft 40 is inserted in a hollow region formed at the center of the rotor 20, and rotates together with the rotor 20.

During operation, when the rotor 20 moves via the rotary shaft 40 with respect to the stator 16, the permanent magnets 38 are moved past the windings 39 and voltage is thus generated in the windings 39 through electromagnetic induction. Conversely, if current is supplied to the windings 39 by, for example, a battery (not shown), a magnetic field is consequently generated at the stator teeth 30, which interacts with the permanent magnets 38 in the rotor 20 such that the rotor 20 and the attached rotary shaft 40 rotate to generate a rotary driving force.

Turning again to the slot openings 31-36 for each of the slots 23-28, torque ripple and cogging in the motor 10 is caused predominantly by the slotting effects between the rotor 20 and the stator slot openings 31-36. The slotting effect is the interaction of the stator slots 23-28 and the rotor slot as produced by the magnet 38. The torque ripple between the rotor 20 and a particular stator slot 23-28 can have either positive or negative values. Adjusting the location of the slot openings 31-36 relative to the slots tends to influence the slotting effect, and hence, the torque ripple. The adjustment of the slot openings 31-36 tends to average the positive and negative torque ripple values and attempts to cancel out the effects of the torque ripple. Thus, in accordance with an exemplary embodiment of the present invention, the motor 10 has at least one slot opening 31-36 that is offset with respect to the center of the respective slot 23-28. As discussed in further detail below, one or more of the slot openings 31-36 can be adjusted to reduce torque ripple. For example, as viewed in FIG. 1, the first slot opening 31 of the first slot 23 has a central axis 41 that is to the left of a central axis 47 of the first slot 23. The first slot opening 31 is defined by a first side wall 55 and a second side wall 56, and the first slot 23 is defined by a first side wall 67 and a second side wall 68. The first side wall 55 of the first slot opening 31 is approximately aligned with the first side wall 67 of the first slot 23.

The second slot opening 32 of the second slot 24 has a central axis 42 that is also to the left of a central axis 48 of the second slot 24, although at a different relative position as compared to the first slot opening 31. The second slot opening 32 is defined by a first side wall 57 and a second side wall 58, and the second slot 24 is defined by a first side wall 69 and a second side wall 70. The second side wall 58 of the second slot opening 32 is approximately aligned with the central axis 48 of the second slot 24.

The third slot opening 33 of the third slot 25 has a central axis 43 that is aligned with a central axis 49 of the third slot 25. The third slot opening 33 is defined by a first side wall 59 and a second side wall 60, and the third slot 25 is defined by a first side wall 71 and a second side wall 72. As illustrated, none of the side walls 59 and 60 of the third slot opening 33 align with the side walls 71 and 72 of the third slot 25.

The fourth slot opening 34 of the fourth slot 26 has a central axis 44 that is aligned with a central axis 50 of the fourth slot 26. The fourth slot opening 34 is defined by a first side wall 61 and a second side wall 62, and the fourth slot 26 is defined by a first side wall 73 and a second side wall 74. As illustrated, none of the side walls 61 and 62 of the fourth slot opening 34 align with the side walls 73 and 74 of the fourth slot 26.

The fifth slot opening 35 of the fifth slot 27 has a central axis 45 that is to the right of a central axis 51 of the fifth slot 27. The fifth slot opening 35 is defined by a first side wall 63 and a second side wall 64, and the fifth slot 27 is defined by a first side wall 75 and a second side wall 76. The first side wall 63 of the fifth slot opening 35 is approximately aligned with the central axis 51 of the fifth slot 27.

The sixth slot opening 36 of the sixth slot 28 has a central axis 46 that is to the right of a central axis 52 of the sixth slot 28. The sixth slot opening 36 is defined by a first side wall 65 and a second side wall 66, and the sixth slot 28 is defined by a first side wall 77 and a second side wall 78. The second side wall 66 of the sixth slot opening 36 is approximately aligned with the second side wall 78 of the sixth slot 28.

The arrangement of the slot openings 31-36 is just one of many examples of the various positions of slot openings 31-36. In one embodiment, the slot openings 31-33 of the first, second, and third slots 23-25 are symmetrical with respect to the slot openings 34-36 of the fourth, fifth and sixth slots 26-28. In other words, the slot opening 31 of the first slot 23 is a mirror image of the slot opening 36 of the sixth slot 28; the slot opening 32 of the second slot 24 is a mirror image of the slot opening 35 of the fifth slot 27; and the slot opening 33 of the third slot is a mirror image of the slot opening 34 of the fourth slot 26. In one embodiment, the pattern formed by the slot openings 31-36 of the group of six slots 23-28 is repeated around the circumference of the stator 22. In another embodiment, the pattern formed by the slot openings 31-36 of the six slots 23-28 is not repeated around the circumference of the stator 22. The slot openings 31-36 can be modified as necessary to optimally reduce torque ripple in the motor 10. Although the slot openings 31-36 in the motor 10 are the same size, in an alternate embodiment, the size of the slot openings 31-36 can additionally be adjusted. Moreover, in alternate embodiments, the slot openings 31-36 within a pole do not have to be in a symmetrical pattern, nor do the slot openings 31-36 need to be aligned with a respective axis or respective side wall of the corresponding slot 23-28.

Figure 2:
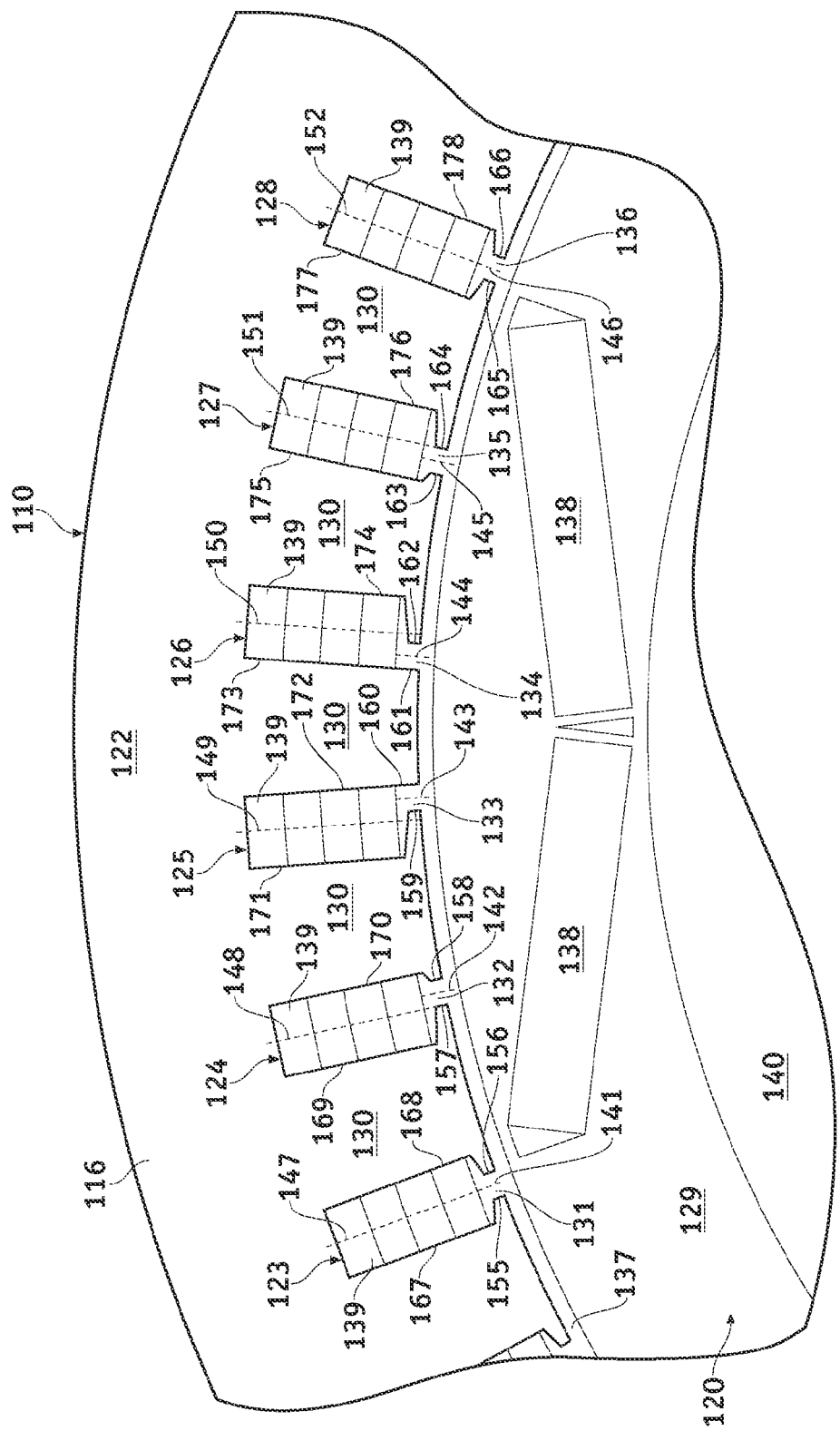
FIG. 2 is a partial cross-sectional view of a permanent magnet motor in accordance with another exemplary embodiment of the present invention.

FIG. 2 is another exemplary motor 110 in accordance with the present invention. As in the motor 10 depicted in FIG. 1, the motor 110 includes a stator 116 and a rotor 120 rotatably disposed within the stator 116. The stator 116 includes a stator core 122 that includes a plurality of slots 123-128 arranged in a circumferential arrangement. FIG. 2 illustrates a first slot 123, a second slot 124, a third slot 125, a fourth slot 126, a fifth slot 127, and a sixth slot 128. As discussed in further detail below, each of the slots has a respective slot opening 131-136. The stator core 122 also includes a plurality of stator teeth 130 that are disposed between the slots 123-128. Bar windings 139 are inserted into each of the slots 123-128. The rotor 120 includes a rotor core 129 spaced apart from the stator core 122 by a gap 137 and supporting a plurality of permanent magnets 138. Six stator slots 123-128 are illustrated in the view in FIG. 2, and the six stator slots 123-128 correspond to one pole of the motor 110. However, any phase, pole, and slot configurations are possible.

Turning again to the slot openings 131-136, the motor 110 in accordance with an exemplary embodiment of the present invention has at least one slot opening 131-136 that is offset with respect to the respective slot 123-128. The first slot opening 131 of the first slot 123 has a central axis 141 that is aligned with a central axis 147 of the first slot 123. The first slot opening 131 is defined by a first side wall 155 and a second side wall 156, and the first slot 123 is defined by a first side wall 167 and a second side wall 168. As illustrated, none of the side walls 155 and 156 of the first slot opening 131 align with the side walls 167 and 168 of the first slot 123.

The second slot opening 132 of the second slot 124 has a central axis 142 that is to the right of a central axis 148 of the second slot 124. The second slot opening 132 is defined by a first side wall 157 and a second side wall 158, and the second slot 124 is defined by a first side wall 169 and a second side wall 170. The first side wall 157 of the second slot opening 132 is approximately aligned with the central axis 148 of the second slot 124.

The third slot opening 133 of the third slot 125 has a central axis 143 to the right of a central axis 149 of the third slot 125. The third slot opening 133 is defined by a first side wall 159 and a second side wall 160, and the third slot 125 is defined by a first side wall 171 and a second side wall 172. The second side wall 160 of the third slot opening 133 is approximately aligned with the second side wall 172 of the third slot 125.

The fourth slot opening 134 of the fourth slot 126 has a central axis 144 that is to the left of a central axis 150 of the fourth slot 126. The fourth slot opening 134 is defined by a first side wall 161 and a second side wall 162, and the third slot 126 is defined by a first side wall 173 and a second side wall 174. The second side wall 161 of the fourth slot opening 134 is aligned with the second side wall 175 of the fourth slot 126.

The fifth slot opening 135 of the fifth slot 127 has a central axis 145 that is to the left of a central axis 151 of the fifth slot 127. The fifth slot opening 135 is defined by a first side wall 163 and a second side wall 164, and the fifth slot 127 is defined by a first side wall 175 and a second side wall 176. The second side wall 164 of the fifth slot opening 135 is approximately aligned with the central axis 151 of the fifth slot 127.

The sixth slot opening 136 of the sixth slot 128 has a central axis 146 that is aligned with a central axis 152 of the sixth slot 128. The sixth slot opening 136 is defined by a first side wall 165 and a second side wall 166, and the sixth slot 128 is defined by a first side wall 177 and a second side wall 178. As illustrated, none of the side walls 165 and 166 of the sixth slot opening 136 align with the side walls 177 and 178 of the sixth slot 128.

Accordingly, in one embodiment, the slot openings 131-133 of the first, second, and third slots 123-125 are symmetrical with respect to the slot openings 134-136 of the fourth, fifth and sixth slots 126-128, respectively. In another embodiment, the pattern formed by the slot openings 131-136 of the group of six slots 123-128 is repeated around the circumference of the stator 116. In another embodiment, the pattern formed by the slot openings 131-136 of the six slots 123-128 is not repeated around the circumference of the stator 122. In yet another embodiment, it will be appreciated that the slot openings 131-136 can be modified as necessary to optimize the motor 110. For example, the slot openings 131-136 can be adjusted to reduce the torque ripple of the motor 110. Moreover, as noted above, in an alternative embodiment, the slot openings 131-136 within a pole do not have be in a symmetrical pattern, nor do the slot openings 131-136 need to be aligned with a respective axis or respective side wall of the corresponding slot 123-128.

Figure 3:
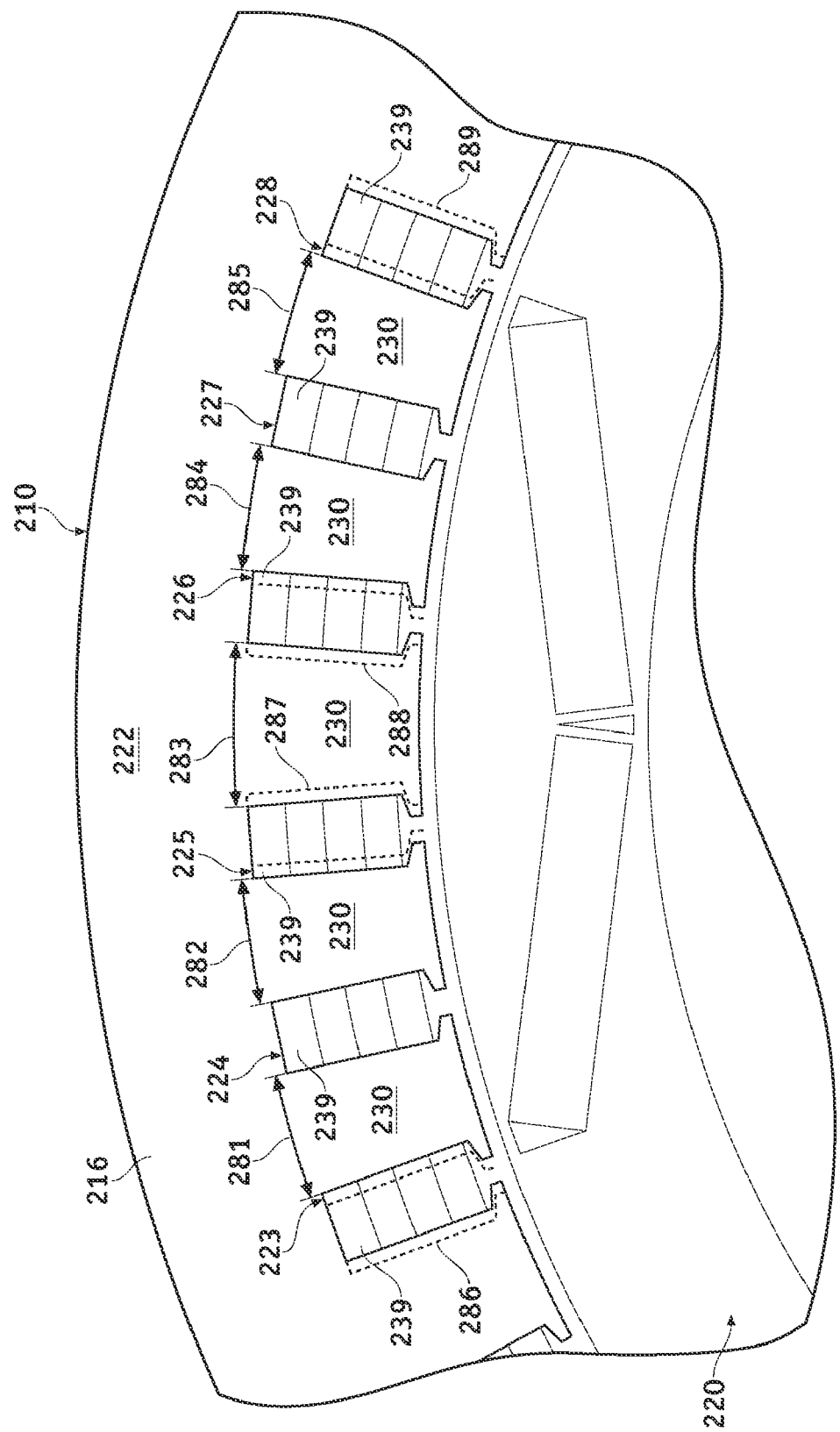
FIG. 3 is a partial cross-sectional view of a permanent magnet motor in accordance with another exemplary embodiment of the present invention.

FIG. 3 is another motor 210 in accordance with an exemplary embodiment of the present invention. As in the motors 10 and 110 respectively depicted in FIGS. 1 and 2, the motor 210 includes a stator 216 and a rotor 220 rotatably disposed within the stator 216. The stator 216 includes a stator core 222 that includes a plurality of slots 223-228 arranged in a circumferential arrangement. FIG. 3 illustrates a first slot 223, a second slot 224, a third slot 225, a fourth slot 226, a fifth slot 227, and a sixth slot 228. The stator core 222 also includes a plurality of stator teeth 230 that are disposed between the slots 223-228. Bar windings 239 are inserted into each of the slots 223-228. Alternatively, wire windings (not shown) can be used instead of the bar windings 239.

The first slot 223 is separated from the second slot 224 by a first distance 281. The second slot 224 is separated from the third slot 225 by a second distance 282. The third slot 225 is separated from the fourth slot 226 by a third distance 283. The fourth slot 226 is separated from the fifth slot 227 by a fourth distance 284. The fifth slot 227 is separated from the sixth slot 228 by a fifth distance 285.

The distances 281-285 can follow a symmetrical or non-symmetrical pattern. Thus, contrary to conventional stators, the first, second, third, fourth, and fifth distances 281-285 are not necessarily equal. In other words, the positions of the slots 223-228 can be adjusted to adjust the distances 281-285 between them. For example, a first dashed outline 286 indicates the position of a conventional first slot and illustrates that the first slot 223 has been shifted to the right. A second dashed outline 287 indicates the position of a conventional third slot and illustrates that the third slot 225 has been shifted to the left. A third dashed outline 288 indicates the position of a conventional fourth slot and illustrates that the fourth slot 226 has been shifted to the right. A fourth dashed outline 289 indicates the position of a conventional sixth slot and illustrates that the sixth slot 228 has been shifted to the left. It will be appreciated that the distances 281-285 between the slots 223-228 can be adjusted as necessary to reduce the torque ripple. In further alternate embodiments, the slots 23-28 and 123-128 of the motors 10 and 110 of FIGS. 1 and 2 can also be adjusted.

Figure 4:
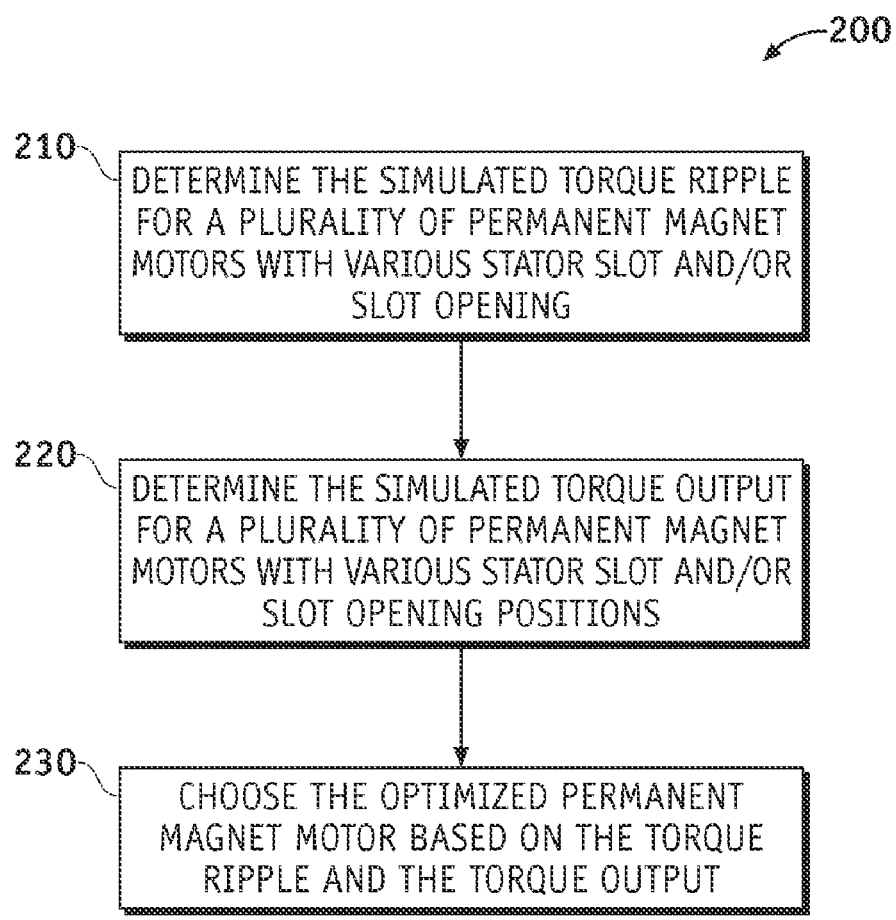
FIG. 4 is a flow chart illustrating a method for designing permanent magnet motors in accordance with an exemplary embodiment of the present invention.
Figure 5:
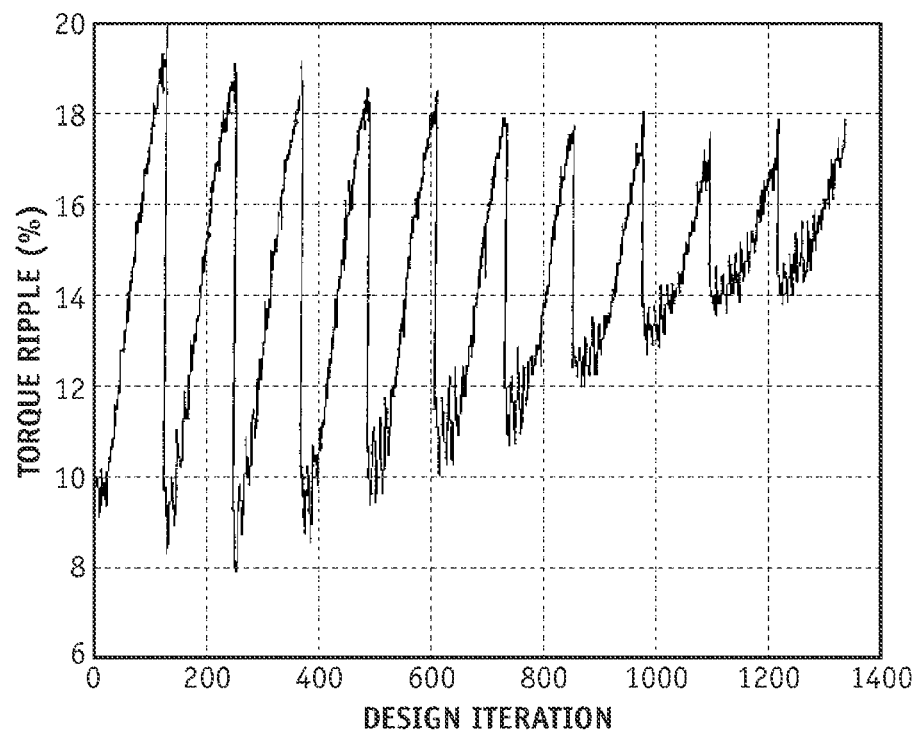
FIG. 5 is a graph representing the torque ripple associated with permanent magnet motors as slot openings are adjusted.
Figure 6:
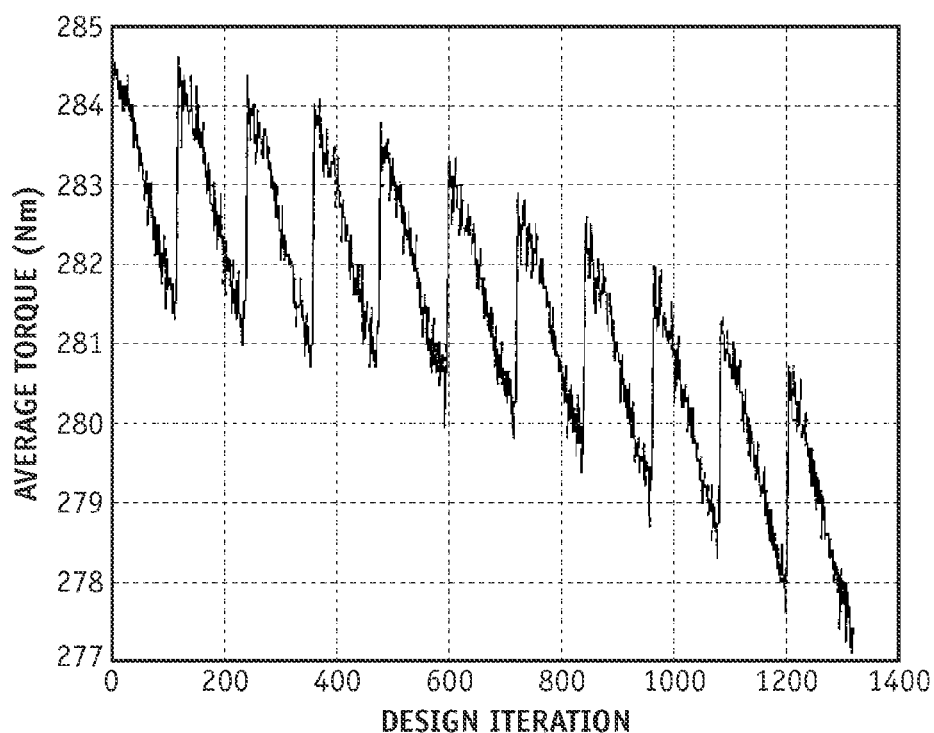
FIG. 6 is a graph representing the average torque associated with permanent magnet motors as slot openings are adjusted.

FIG. 4 illustrates a method 200 for designing a permanent magnet motor in accordance with an exemplary embodiment of the invention. In step 210 of the method 200, a simulated torque ripple is determined for a plurality of permanent magnet motors, each with varying stator slot and/or slot opening positions. The torque ripple can be simulated with finite element analysis (FEA) simulation tools. FIG. 5 is a graph representing the torque ripples associated with the permanent magnet motors of almost 1400 design iterations of the stator slots and/or stator slot openings. The torque ripple is expressed as a percentage of the average torque of the motor. Two of the design iterations can correspond, for example, to the motors 10 and 110 illustrated in FIGS. 1 and 2. As can be seen in FIG. 5, in step 220, a simulated average torque output is determined for the plurality of permanent magnet motors with the varying slot and/or slot opening positions. FIG. 6 is a graph representing the average torque output, expressed in Newton-meters (Nm), associated with the permanent magnets, and generally corresponds to the design iterations represented in FIG. 5.

In step 230, the permanent magnet motor with the optimized slot and/or slot opening positions is selected based on the torque ripple and the average torque output. Generally, it is desirable to decrease the torque ripple without substantially decreasing the average torque. Accordingly, an "optimized" permanent magnet motor is one in which the torque ripple is decreased to the greatest extent without unacceptably lowering the average torque. In one embodiment, the average torque should not decrease by more than 4%. As shown in FIG. 4, the average torque ripple was reduced to 8% of the original torque at about the $240^{th}$ iteration. As shown in FIG. 6, the average torque for the $240^{th}$ iteration is 284.5, which is approximately equal to the original torque. Thus, for a particular design, an optimized slot opening arrangement is provided in about the $240^{th}$ design iteration. It is noted that the slot openings 31-36 and 131-136 are just two examples of optimized arrangements. Other arrangements can be provided.

Accordingly, permanent magnet motors demonstrating reduced torque ripple and methods for designing permanent magnet motors with reduced torque ripple have been provided. The motors and methods provide for a reduction in torque ripple without a substantial attendant increase in manufacturing complexity and/or decrease in performance.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A permanent magnet motor, comprising:
   a stator having a hollow core and defining a plurality of slots,
      wherein each of the plurality of slots is defined by respective first and second side walls, and a respective slot opening, each of the plurality of slots further having a respective slot central axis,
         wherein each of the respective slot openings is defined by respective first and second slot opening side walls and has a respective slot opening central axis,
         wherein the plurality of slots is grouped into a plurality of groups of slots, and wherein each group of slots corresponds to a rotor pole of the permanent magnet motor,
         wherein each group of slots includes
            a first slot in which the respective slot opening central axis is circumferentially spaced from the respective first side wall at a first distance,
            a second slot in which the respective slot opening central axis is circumferentially spaced from the respective first side wall at a second distance, and
            a third slot in which the respective slot opening central axis is circumferentially spaced from the respective first side wall at a third distance, and
         wherein the first, second and third distances are different from one another;
   a winding disposed in each of the slots;
   a rotor rotatably disposed inside the hollow core of the stator; and
   a plurality of permanent magnets supported by the rotor,
      wherein the second slot is arranged circumferentially between the first slot and the third slot
      wherein each group of slots includes a fourth slot arranged such that the third slot is circumferentially between the fourth slot and the first slot, and wherein the respective slot opening central axis of the fourth slot is circumferentially spaced from the respective first side wall of the fourth slot at a fourth distance, the fourth distance being different than the first distance,
      wherein each group of slots includes a fifth slot arranged such that the fourth slot is circumferentially between the fifth slot and the first slot, and wherein the respective slot opening central axis of the fifth slot is circumferentially spaced from the respective first side wall of the fifth slot at a fifth distance,
      wherein each group of slots includes a sixth slot arranged such that the fifth slot is circumferentially between the sixth slot and the first slot, and wherein the respective slot opening central axis of the sixth slot is circumferentially spaced from the respective first side wall of the sixth slot at a sixth distance,
      wherein the first, second, third, fourth, fifth, and sixth slots are arranged in a symmetrical pattern, and
      wherein the first distance is less than each of the second, third, fourth, fifth, and sixth distances.

2. The permanent magnet motor of claim 1, wherein the rotor is adapted to be coupled to a shaft of an automobile.

3. The permanent magnet motor of claim 1, wherein the slot openings are positioned relative to the plurality of slots such that torque ripple is reduced.

4. The permanent magnet motor of claim 1, wherein the respective slot central axis of the third slot is radially aligned with the respective slot opening central axis of the third slot.

5. The permanent magnet motor of claim 4, wherein the second distance is greater than the first distance and less than the third distance.

6. The permanent magnet motor of claim 5, wherein the respective slot central axis of the fourth slot is radially aligned with the respective slot opening central axis of the fourth slot, the respective second slot wall of the sixth slot is radially aligned with the respective second slot opening side wall of the sixth slot, and the fifth distance is greater than the fourth distance and less than the sixth distance.

7. A permanent magnet motor, comprising:
   a stator having a hollow core and defining a plurality of slots,
      wherein each of the plurality of slots is defined by respective first and second side walls, and a respective slot opening, each of the plurality of slots further having a respective slot central axis,
         wherein each of the respective slot openings is defined by respective first and second slot opening side walls and has a respective slot opening central axis,
         wherein the plurality of slots is grouped into a plurality of groups of slots, and wherein each group of slots corresponds to a rotor pole of the permanent magnet motor,
         wherein each group of slots includes
            a first slot in which the respective slot opening central axis is circumferentially spaced from the respective first side wall at a first distance,
            a second slot in which the respective slot opening central axis is circumferentially spaced from the respective first side wall at a second distance, and
            a third slot in which the respective slot opening central axis is circumferentially spaced from the respective first side wall at a third distance, and
   wherein the first, second and third distances are different from one another;

a winding disposed in each of the slots;

a rotor rotatably disposed inside the hollow core of the stator; and a plurality of permanent magnets supported by the rotor, wherein the second slot is arranged circumferentially between the first slot and the third slot wherein each group of slots includes a fourth slot arranged such that the third slot is circumferentially between the fourth slot and the first slot, and wherein the respective slot opening central axis of the fourth slot is circumferentially spaced from the respective first side wall of the fourth slot at a fourth distance, the fourth distance being different than the first distance, wherein each group of slots includes a fifth slot arranged such that the fourth slot is circumferentially between the fifth slot and the first slot, and wherein the respective slot opening central axis of the fifth slot is circumferentially spaced from the respective first side wall of the fifth slot at a fifth distance, wherein each group of slots includes a sixth slot arranged such that the fifth slot is circumferentially between the sixth slot and the first slot, and wherein the respective slot opening central axis of the sixth slot is circumferentially spaced from the respective first side wall of the sixth slot at a sixth distance, wherein the first, second, third, fourth, fifth, and sixth slots are arranged in a symmetrical pattern, and wherein the respective slot central axis of the first slot is radially aligned with the respective slot opening central axis of the first slot, the respective second slot wall of the third slot is radially aligned with the second slot opening side wall of the third slot, and the second distance is greater than the first distance and less than the third distance.

8. The permanent magnet motor of claim 7, wherein the respective second slot wall of the fourth slot is radially aligned with the first slot opening side wall, the respective slot central axis of the sixth slot is radially aligned with the respective slot opening central axis of the sixth slot, and the fifth distance is greater than the fourth distance and less than the sixth distance.

* * * * *